(12) United States Patent
Ott et al.

(10) Patent No.: US 10,694,723 B2
(45) Date of Patent: Jun. 30, 2020

(54) LIGHT FIXTURE AND METHOD FOR CONTROLLING THE SPECTRAL DISTRIBUTION OF SAID LIGHT FIXTURE

(71) Applicant: Eaton Intelligent Power Limited, Dublin (IE)

(72) Inventors: Toni Ott, Neckargemünd (DE); Jens Burmeister, Eberbach (DE)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/083,614

(22) PCT Filed: Mar. 1, 2017

(86) PCT No.: PCT/EP2017/054709
§ 371 (c)(1),
(2) Date: Sep. 10, 2018

(87) PCT Pub. No.: WO2017/153215
PCT Pub. Date: Sep. 14, 2017

(65) Prior Publication Data
US 2019/0075766 A1 Mar. 14, 2019

(30) Foreign Application Priority Data
Mar. 10, 2016 (DE) .......... 10 2016 203 978

(51) Int. Cl.
*A01K 63/06* (2006.01)
*A01K 1/00* (2006.01)
*F21V 9/40* (2018.01)
*A01K 45/00* (2006.01)
(Continued)

(52) U.S. Cl.
CPC .......... *A01K 63/06* (2013.01); *A01K 1/00* (2013.01); *A01K 45/00* (2013.01); *F21V 9/40* (2018.02);
(Continued)

(58) Field of Classification Search
CPC .......... F21Y 2115/10; F21Y 2103/00; F21Y 2113/00; G01J 3/10; G01J 1/58; G01J 2003/1221; G02B 27/0172; G02B 6/0028
(Continued)

(56) References Cited

U.S. PATENT DOCUMENTS 7,781,751 B2 * 8/2010 Gardner .......... G01J 1/58
250/454.11
8,960,954 B1 * 2/2015 Farrell .......... H05B 37/0281
315/129

(Continued)

FOREIGN PATENT DOCUMENTS

DE  20 2006 001 686 U1  8/2006
DE  10 2013 007 128 A1  10/2014
(Continued)

OTHER PUBLICATIONS

International Search Report for PCT/EP2017/054709, dated Feb. 5, 2017, 6 pages.

*Primary Examiner* — David A Vanore
(74) *Attorney, Agent, or Firm* — Stinson LLP

(57) ABSTRACT

The invention relates to a light fixture (1) having at least one lighting means (2) in a light fixture housing (3) that has at least one light outlet opening (4) for emitting a beam of light out of said light fixture housing. Moreover, a spectral distribution variation device (5) which, in particular, temporally varies a spectral distribution of the beam of light, is associated with the lighting means (2) and/or the light fixture housing (3).

19 Claims, 3 Drawing Sheets

(51) Int. Cl.
*F21V 23/04* (2006.01)
*F21Y 113/13* (2016.01)

(52) U.S. Cl.
CPC ....... *F21V 23/0464* (2013.01); *F21Y 2113/13* (2016.08)

(58) Field of Classification Search
USPC ................ 362/231, 230; 250/504 R, 454.11, 250/455.11, 493.1, 505.1
See application file for complete search history.

(56) References Cited

U.S. PATENT DOCUMENTS

| | | | | |
|---|---|---|---|---|
| 2005/0168982 | A1* | 8/2005 | Miller | A01M 29/10 362/231 |
| 2006/0261291 | A1* | 11/2006 | Gardner, III | A01K 63/06 250/504 R |
| 2008/0079568 | A1* | 4/2008 | Primous | H05B 37/0218 340/541 |
| 2009/0236999 | A1* | 9/2009 | Yufuku | H05B 41/2883 315/287 |
| 2010/0277097 | A1* | 11/2010 | Maxik | F21S 2/00 315/294 |
| 2011/0304268 | A1* | 12/2011 | Bertram | F21V 3/00 315/46 |
| 2012/0112640 | A1* | 5/2012 | Maxik | H05B 37/0227 315/152 |
| 2014/0049983 | A1* | 2/2014 | Nichol | G02B 6/0018 362/610 |

FOREIGN PATENT DOCUMENTS

| | | |
|---|---|---|
| GB | 2460228 A | 11/2009 |
| WO | 2009/029575 A1 | 3/2009 |

* cited by examiner

LIGHT FIXTURE AND METHOD FOR CONTROLLING THE SPECTRAL DISTRIBUTION OF SAID LIGHT FIXTURE

CROSS-REFERENCE TO RELATED APPLICATIONS

This application is a National Stage Entry of, and claims priority to, PCT Patent Application No. PCT/EP2017/054709, filed Mar. 1, 2017, which claims priority to German Patent Application No. DE102016203978.4, filed Mar. 10, 2016, both of which are hereby incorporated by reference in their entirety.

The invention refers to a light fixture with at least one lighting means in a light fixture housing, which has at least one light outlet opening for the exit of a beam of light from the light fixture housing.

Such a light fixture may be a ceiling lamp, suspended lamp, pendant lamp, post lamp or emergency lamp, whereby such an emergency lamp may be designed as one of the aforementioned light fixtures. Such an emergency lamp can also be an explosion-protected lamp.

The corresponding lighting means emits light in a spectral range which essentially corresponds to the visible spectral range. The visible spectral range covers a wavelength range of approximately 380 nm to 780 nm. In addition, the corresponding lighting means can also emit additional light in adjacent areas, i.e. in the IR or UV range. The respective light exits from the light outlet opening of the light fixture housing in the form of a beam of light and usually has an influence on the environment, especially on the natural activities of animals and respective animal species. This is because certain animals or animal species have a higher sensitivity in the certain spectral range of visible light or the adjacent regions and may be influenced negatively or vice versa also positively by light emitted in these spectral ranges.

For example, turtles have been found to have different light sensitivities depending on the species of turtle, the age of the turtle or the habitat of the turtle. Adult turtles, for example, have been found to be attracted to a certain type of light that lies in the yellow-orange to red range of the spectrum, i.e. in a wave range of 630 nm to 700 nm. Another species of turtle, for example, was found to have two higher sensitivity ranges around a wavelength of 640 nm and 575 nm. Furthermore, studies have shown that the respective spectral sensitivity changes with the age of the turtles, so that young animals show different spectral sensitivities than adult animals. With regard to the laying of the eggs of the adult animals or with regard to the hatching of the young animals, the respective spectral sensitivity can be taken into account when illuminating corresponding areas. It should also be noted that the laying of eggs can take place at different times depending on the species of turtle, as can the hatching of corresponding young animals.

In this context, it should also be taken into account that the brightness and direction of the lighting may also have to be taken into account, as just hatched young animals are misled by the excessive brightness of the lighting on their way to the water, or may travel too far and thus become victims of predators.

The respective spectral sensitivity can be different even with the same species of turtles, depending on the habitat, the depth of the water present there, the cleanliness of the water and the like. As a rule, turtles are more sensitive to short wavelengths of visible light because it is less likely to be filtered in the maritime environment than light with longer wavelengths. However, this can be different for turtle species that are more in surface water and dive less deep.

Respective spectral sensitivities also exist in other living beings or animals. For example, different spectral sensitivities were also found in migratory birds of different species. I.e., also for such migratory birds a change of the spectral range of the delivered light can be meaningful, in order not to affect these negatively with breeding or flying.

There are also other animals such as penguins, geese, bats and the like, which all react differently to certain spectral ranges depending on their species.

The object of the present invention is to improve or provide a light fixture of the type mentioned above and a corresponding method to adapt a spectral distribution of the respective light fixture to corresponding spectral sensitivities of the animals or their colour perception, so that these animals/animal species are not negatively influenced at certain times, so that their breeding behaviour or other behaviour is disturbed, for example. At the same time, however, the light fixture should provide sufficient illumination for humans, for example along paths, in squares or the like.

The object is solved by the features of claim 1. In other words, according to the invention, a spectral distribution of the beam of light is assigned to the lighting means and/or the light fixture housing, in particular a spectral distribution variation device that varies over time.

According to the method emission of a beam of light exiting through the light outlet opening and a variation of the spectral distribution of the beam of light is carried out through controlled switching on and off different group of lighting means and/or individual lighting means of the lighting means and/or through controlled adjustment of a filter device. This spectral distribution of the light emitted, which varies in particular in time, allows the spectral distribution to be adapted to the corresponding spectral sensitivities of certain animals/species, for example. This prevents them from being scared off or misdirected by the respective light. In addition, the spectral distribution is controlled over time in order to take into account the different spectral sensitivities of young and old animals during hatching and egg deposition, for example with regard to turtles. This means that the spectral range varies at different times depending on the year in particular. This also applies to migratory birds, for example, which migrate to certain areas at certain times, so that the corresponding variation in the spectral distribution may only have to be taken into account at these times.

It should be noted at this point that no specific ranges are given for the variation of the spectral distribution, as these depend on the animal species, the age of the animals of an animal species, possibly on the ambient lighting in the course of a day, the habitat of the respective animal species and other parameters. However, there are already investigations of different animal species which show such different dependencies in order to then make a variation of the spectral distribution according to the invention with regard to the corresponding parameters.

By varying the spectral distribution over time, it can be taken into account that the young animals of turtles, for example, hatch at a certain time and make their way to the sea. During this time light is emitted with a certain spectral distribution, which is suitable for these young animals, in order to impair them as little as possible on their way to the sea and at the same time not to scare them off them. A different spectral distribution is used, for example, when adult animals leave the sea to lay eggs. Furthermore, at times when no impairment of young or adult animals is to be feared, another spectral distribution can be used, since no consideration of corresponding young or adult animals is necessary at this time.

This applies analogously to other animal species, such as migratory birds, bats, geese, chickens or the like, which are all only present in a certain area at certain times and only at such times does the spectral range of the light fixture according to the invention be influenced accordingly.

Different possibilities are conceivable through which the spectral distribution can be varied. One possibility is a lighting means which has groups of lighting means with different spectral distributions. Depending on requirements, respective groups of lighting means are switched on or off, wherein several groups of lighting means can also be switched on simultaneously, whereby the different spectral distributions of each group of lighting means are superimposed and an overall spectral distribution results.

It is also conceivable that the lighting means is made up of separately switchable individual lighting means, which, for example, each have different colours. From these individual lighting means, different numbers of the same colour and/or different colours can be used to achieve a certain spectral distribution.

In both cases, the brightness of the group of lighting means or individual lighting means can also be varied.

As already mentioned above, the object of this invention is not only a different spectral distribution, but in particular a temporal variation of the spectral distribution in order to be able to adapt the spectral distribution to different animal/ animal species, different spectral sensitivities and the like. This is usually done in a simple manner by means of a lighting means controller assigned to the lighting means. This can, for example, switch the above-mentioned group of lighting means or individual lighting means on and off or control them differently, depending on requirements.

The lighting means controller can be used manually at certain times to set an appropriate spectral distribution. It is also conceivable that the lighting means controller has a time controller which varies the spectral distribution at certain times in a different way. For such a time controller a manual, as well as an automatic adjustability, is conceivable. If it is certain that corresponding animals or animal species with known spectral sensitivity are present in the illuminated area at certain times, the spectral distribution can be adapted to the spectral sensitivity of the animals or animal species at these times. In particular, this can be done automatically if this always takes place at the same times.

For certain animals and animal species it should also be noted that not only the spectral distribution should be adjusted, but also the brightness of the corresponding light fixture or the direction of radiation should be varied. For this purpose, the lighting means controller can have brightness and/or direction controller for varying the brightness and/or direction of the beam of light. For example, turtles that have just hatched have been found to have orientation difficulties even in the spectral range that is pleasant for them when illuminated too brightly, in order to find their way to the sea, for example. In this case, not only should the spectral range of the light fixture be adjusted accordingly, but also the brightness and/or the beam direction of the beam of light. This is particularly important as turtles usually hatch during the night and then head for the sea. Too bright lighting, especially towards the sea, can cause the young animals that have just hatched to move in the wrong direction to the supposed sea, whereby they are disorientated by the artificial lighting.

Particularly when white light is emitted by the light fixture according to the invention, it can prove advantageous if the influence over time of the spectral distribution is carried out by at least one filter device assigned to the light fixture and in particular to the light outlet opening. The filter device is used as required to vary the spectral distribution and filter out certain spectral ranges. In this way, this corresponding variation of the spectral distribution can also take place at appropriate times with regard to different spectral sensitivities of corresponding animals or animal species.

In order to allow easy variation of the spectral distribution with respect to several animals or animal species and at different times, the filter device may have different spectral range filters. Depending on the requirements, a corresponding spectral range filter is used.

In a simple embodiment, it is conceivable that the filter device and thus the corresponding spectral range filters can be moved relative to the light outlet opening. Depending on the requirements, the filter device itself is used or an appropriate spectral range filter is selected to vary the spectral distribution and, for example, moved into the beam of light emerging from the light outlet opening.

In a simple case and to enable a simple arrangement of filter device and light fixture housing and their relative mobility to each other, it is conceivable that light fixture housing and filter device are tubular and correspondingly rotatable relative to each other. As already mentioned before, a movement of the filter device can be carried out manually or automatically similar to the above-mentioned actuation of the lighting means or for time controller.

With a corresponding automatic control, it may also be advantageous if a filter controller is assigned to the filter device. This filter controller can use the filter device or the corresponding spectral range filters automatically and in particular also time-controlled in order to vary the spectral distribution per se and for certain times, for example depending on the time of day or also depending on the season.

In order to be able to easily adjust the brightness of the light fixture in addition to the variation of the spectral distribution, a brightness sensor can be assigned to the light fixture. Of course, it is also conceivable that such a brightness sensor is assigned to several lighting means simultaneously. For example, the brightness sensor can be used to adjust the brightness of the light fixture in order to dim it to a certain extent in order to avoid a negative influence on corresponding animals or animal species, see the above statements.

At this point it should also be pointed out that the measures mentioned to influence the spectral distribution generally have little influence on humans, as they generally consider illumination of corresponding paths or streets or the like with a varied spectral distribution to be sufficient. In addition, the spectral distribution can also be varied with regard to human activities, so that negative or positive effects on animals or animal species can be weighed against those on humans.

The invention also concerns a corresponding method for controlling the spectral distribution of a light fixture, the method being characterised in particular by the following steps:

Emission of a beam of light emerging through the light outlet opening; and

Variation of the spectral distribution of the beam of light by controlled switching on and off of different groups of lighting means and/or individual lighting means and/or by controlled adjustment of a filter device.

It is of course possible that these devices can be used to influence the spectral distributions not only on their own but also in combination.

This means, for example, groups of lighting means and individual lighting means can be used simultaneously with a corresponding light fixture to vary the spectral distribution. This applies analogously to the filter device in connection with groups of lighting means and/or individual lighting means. This means that the filter device can be used to further vary the spectral distribution already varied by the groups of lighting means or individual lighting means.

A corresponding influence on the spectral distribution is usually time-controlled, whereby brightness and/or direction can be additionally varied when the beam of light is emitted.

Since certain animals or animal species have a corresponding sensitivity not only in the visible range of the spectrum, light emission can be influenced, according to the invention, not only in the visible range, but also, if necessary, in adjacent areas in the UV and IR range. Accordingly, it is also possible to influence the spectrum in these areas.

Due to the various adjustment options according to the invention, it is also possible to influence the colour rendering index in addition to a variant of spectral distribution, brightness, light emission direction and the like. Such a colour rendering index is a characteristic describing the quality of colour rendering of light sources of the same correlated colour temperature.

In summary, this invention serves to take into account different colour perceptions of respective animals or animal species in comparison to humans and to adapt a respective light fixture in such a way that the spectral range of the emitted light is influenced. In addition to the variation of the spectral range, a variation of brightness, light emission direction and the like is also possible. Since the colour perception or spectral sensitivity of respective animals of even one animal species, and in particular of different animal species, is different, the invention serves to adapt the spectral distribution according to requirements with regard to the different animals or animal species. The respective adaptation depends on the respective animal species or the respective animals and will take into account the corresponding findings of the spectral sensitivity or colour perception of the animals or animal species. For this purpose, existing findings in this respect can be used or the corresponding sensitivities or colour perceptions are additionally determined for the respective animals or animal species.

In the following, the invention is explained and described in more detail using the figures attached to the drawings.

Figure 1:
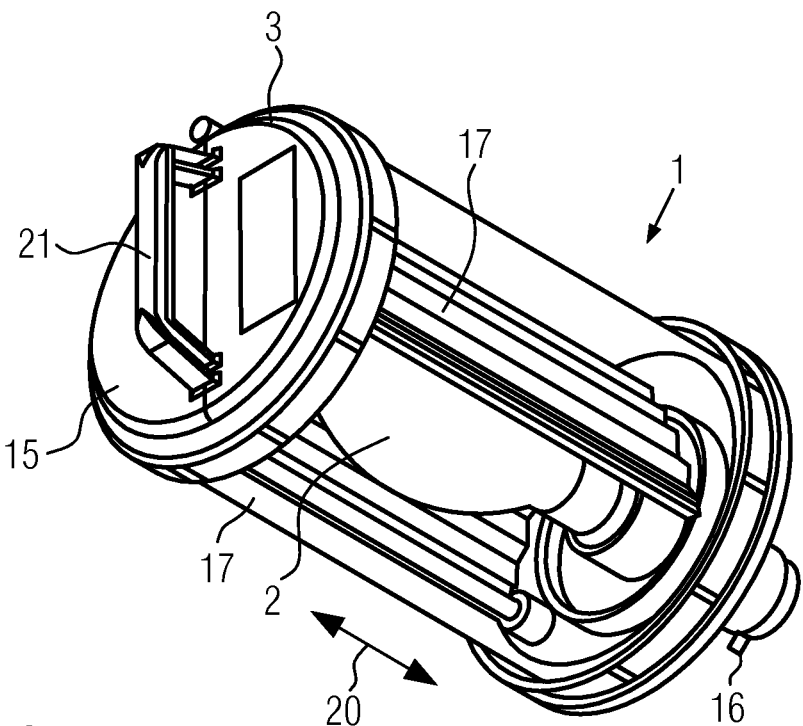
FIG. 1 shows a perspective side view from an oblique bottom onto an embodiment of a light fixture according to the invention.
Figure 2:
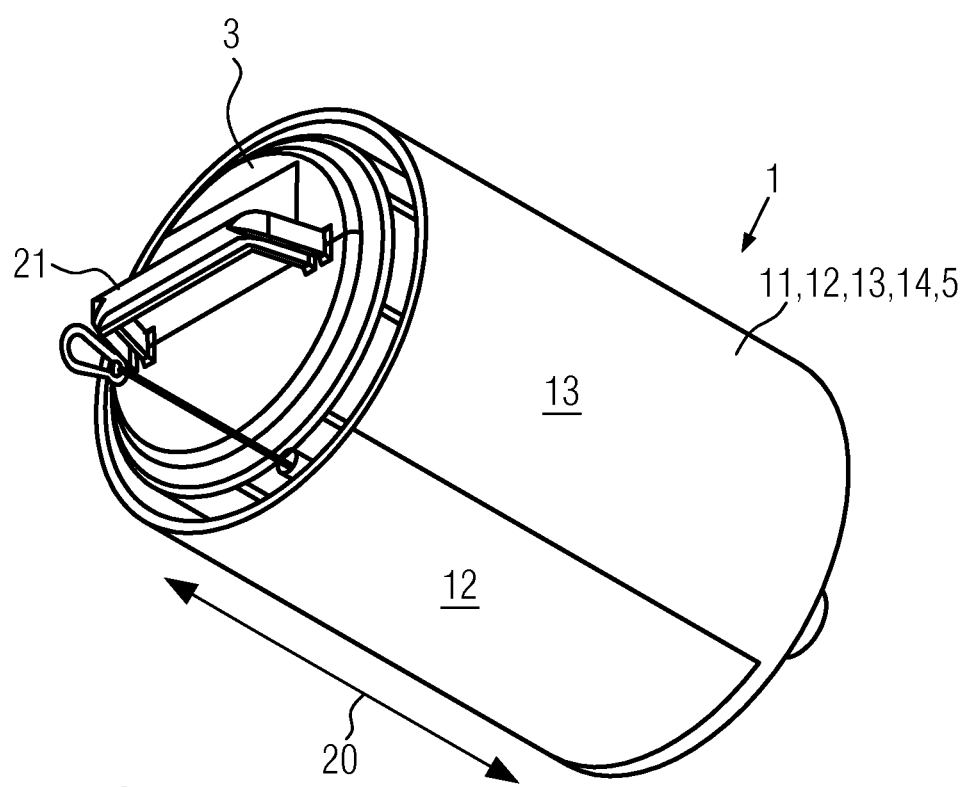
FIG. 2 shows an illustration analogous to FIG. 1 with filter device.

FIG. 1 shows a perspective view from an angle at the bottom of an embodiment of a light fixture 1 according to the invention. This lighting fixture is essentially tubular and extends in the longitudinal direction 20. A lighting means 2 is arranged inside the light fixture. For example, reflective devices 17 are arranged around the light fixture, which direct light emitted by light fixture 2 in the direction of a light outlet opening 4, see also FIGS. 3 and 4. The lighting means 2 is surrounded by a glass tube 18, see again FIGS. 3 and 4, which is also surrounded by an also tubular filter device 11. This is shown in FIG. 2 and omitted for simplification in FIG. 1. Corresponding end covers are arranged at both ends of light fixture 1, which serve both to hold the glass tube 18 and for rotatably holding the filter device 11. The filter device 11, for example, can be rotated relative to the glass tube and thus to light fixture 2 by means of a handle 21. In addition, a corresponding filter controller 15 for automatic rotation of the filter device 11 can be arranged in at least one of the covers.

In FIG. 1, a brightness sensor 16 for detecting ambient brightness is also arranged at one end of light fixture 1. This can also be used to detect the brightness of the light emitted by light fixture 1 in a certain irradiation range and to reduce or increase the brightness of the light fixture if necessary.

FIG. 2 shows a view analogous to FIG. 1 with filter device 11, which in the embodiment described has three spectral range filters 12, 13 and 14. These are arranged one behind the other in the circumferential direction of light fixture 1, so that a specific spectral range filter can be assigned to the light outlet opening, see also FIGS. 3 and 4. By appropriate arrangement of a spectral range filter 12 to 14, the light emitted by the light fixture 1 is varied in its spectral distribution.

As already mentioned, the corresponding rotation of the filter device 11 relative to the remaining light fixture housing 3 can be done manually and/or automatically.

Figure 3:
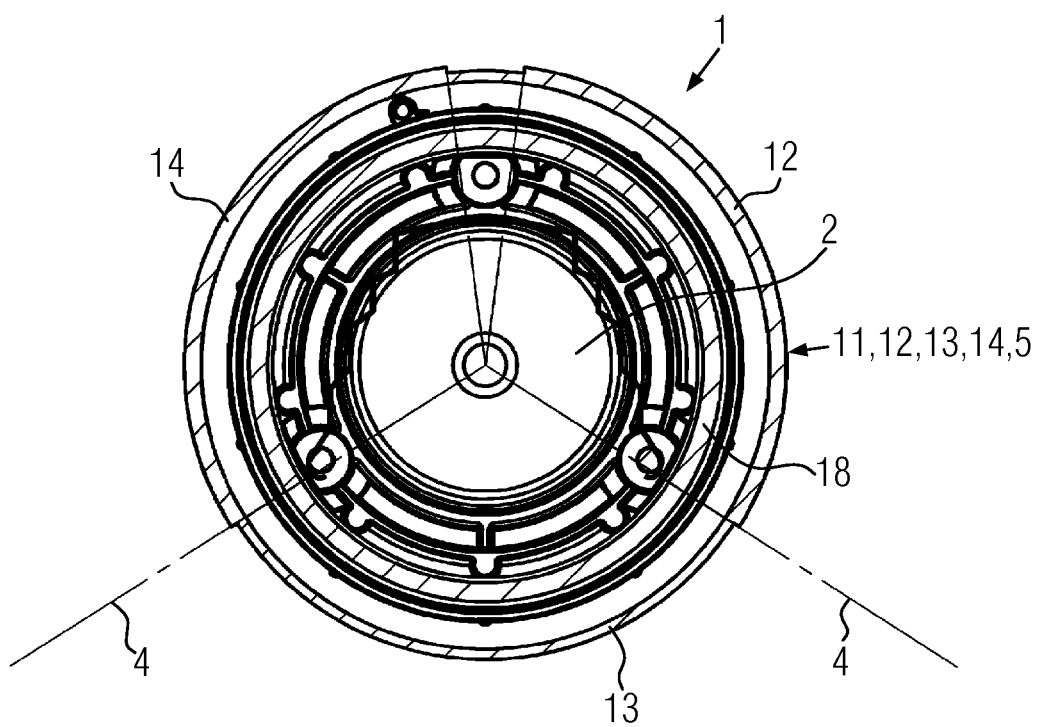
FIG. 3 shows a cut perpendicular to the longitudinal direction of the light fixture as shown in FIG. 1.
Figure 4:
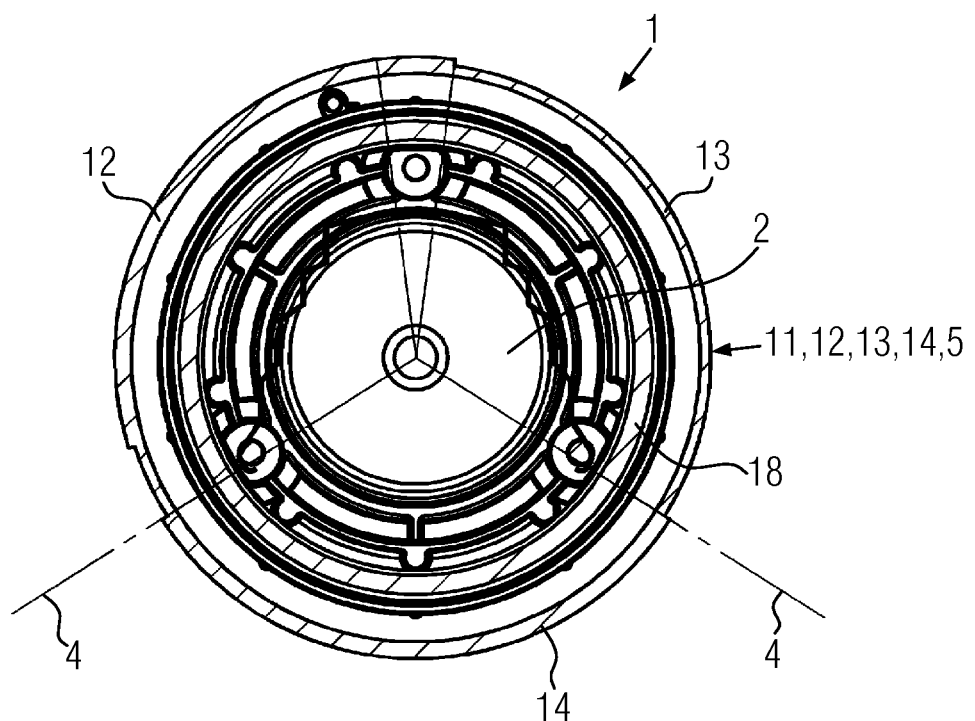
FIG. 4 shows a cut analogous to FIG. 3 for a different position of the filter device.

FIGS. 3 and 4 each show a section perpendicular to the longitudinal direction 20 through light fixture 1 according to FIGS. 1 and 2. FIGS. 3 and 4 differ in the assignment of a respective spectral range filter 12 to 14 to the corresponding light outlet opening 4, which is described by the two lines running diagonally downwards in the plane of the figure. Light fixture 1 contains lighting means 2. This lighting means is surrounded by the glass tube 18 and the filter device 11.

In FIG. 3 the spectral range filter 13 is assigned to the light outlet opening 4 and in FIG. 4 the spectral range filter 14 to the light outlet opening 4.

The light emitted is filtered by the corresponding spectral range filters 13 or 14 according to FIGS. 3 and 4 to vary the spectral distribution. This variation takes place with regard to corresponding colour perceptions or spectral sensitivities of animals or animal species. This was described in more detail in the introductory part of the application.

The assignment of the spectral range filters 12 to 14 to the light outlet opening 4 is time-controlled, so that, for example, light with a certain spectral distribution is emitted depending on the time of day or the season. The corresponding spectral range filter lies within the radiation range of the light fixture according to the invention and in particular in the direction of an area to be illuminated.

According to the invention, it is possible that the tubular filter device can be rotated manually or by means of the corresponding filter controller into the respective position. The filter controller can also have a time controller which, depending on the time of day or the season, rotates the filter device relative to the rest of the light fixture housing 3.

The corresponding lighting means 2 according to FIGS. 1 to 4 can be a lighting means that mainly emits light in the visible range from about 380 nm to 780 nm. In addition, emitted light can cover directly adjacent areas of this spectral range, such as UV and IR ranges. Filtering through the filter device can be performed not only in the visible range but also in these edge areas of the corresponding spectral range.

Figure 5:
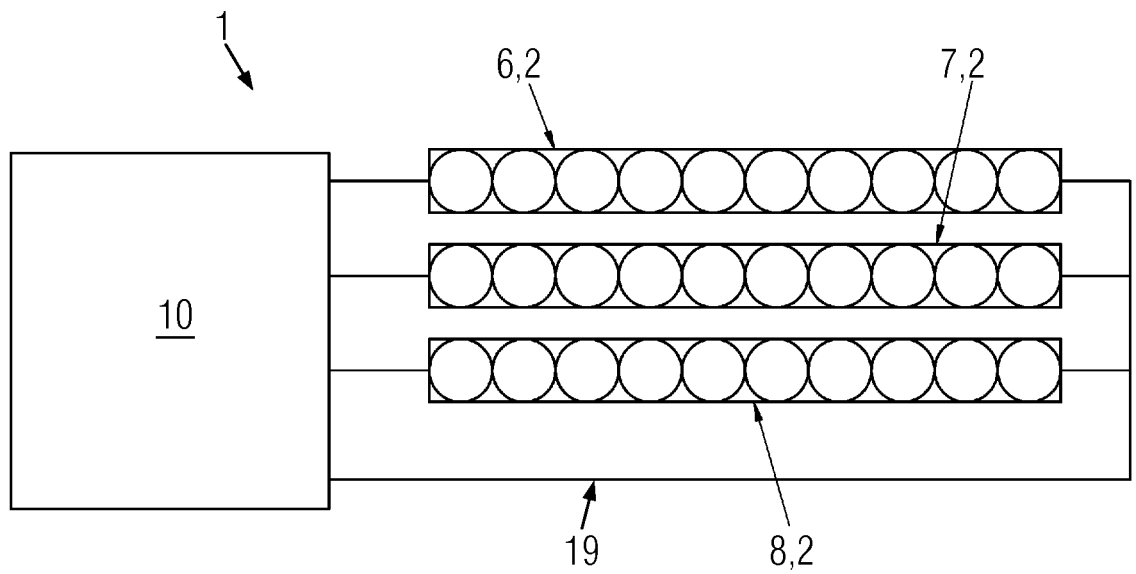
FIG. 5 shows a schematic diagram of a light fixture with a number of group of lighting means.
Figure 6:
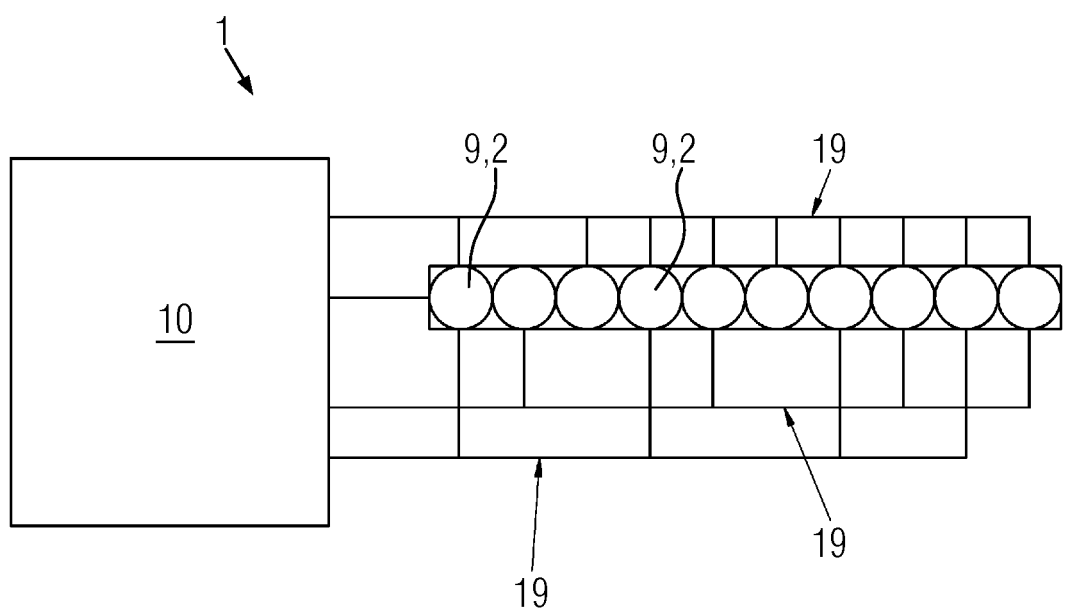
FIG. 6 shows a light fixture similar to FIG. 5 with a series of individual lighting means.

FIGS. 5 and 6 show an alternative or combined way of influencing the spectral distribution. In this context, lighting means 2 is formed by a series of lighting means groups 6, 7, 8 or individual lighting means 9. These are connected via wiring 19 to a lighting means controller 10. This makes it possible, for example, to switch different lighting means groups 6, 7, 8 on and off or to control individual lighting means 9 accordingly.

The different lighting means of the lighting means groups or the individual lighting means have different colours, so that a corresponding spectral distribution results from the selection of appropriate brightnesses, number and colour of the lighting means. Like the previous spectral distribution, this can be varied variably and in particular time-controlled.

It is also possible to combine corresponding lighting means groups 6, 7, 8 with individual lighting means 9 and vice versa. In addition, a corresponding light fixture 1 according to FIGS. 5 and 6 can have a filter device 11 and in particular one with spectral range filters 12, 13, 14, analogous to FIGS. 1 to 4.

The corresponding lighting means controller 10 serves to actuate the corresponding lighting means according to FIGS. 5 and 6 and to control them over time to vary the corresponding spectral distribution. The lighting means controller 10 can also include a corresponding filter controller 15.

The individual lighting means sources can have different colours as well as the lighting means of a corresponding lighting means group. In addition, the colour rendering index may be variable depending on which light fixtures and spectral filters are used.

According to the invention, this makes it possible to take different spectral sensitivities of animals or animal species into account on a time-controlled basis by amplifying and/or suppressing certain spectral ranges if necessary and thus not negatively influencing the breeding behaviour, social behaviour, migration and hatching behaviour or the like of animals or animal species, for example. At the same time, adequate lighting should be maintained for humans in appropriate areas such as paths, roads, company premises or the like.

The invention claimed is:

1. A light fixture comprising:
   a light fixture housing including at least one light outlet opening configured to permit the exit of a beam of light from the light fixture housing;
   at least one lighting source in the light fixture housing for emitting the beam of light, and
   a spectral distribution variation device configured to vary a spectral distribution of the beam of light, the spectral distribution variation device being associated with the at least one lighting source and/or the light fixture housing;
   wherein the at least one lighting source comprises two or more lighting source groups, at least two of the lighting source groups being configured to emit light of different spectral distributions, and wherein the spectral distribution variation device includes at least one filter configured to vary the spectral distribution of the beam of light that exits from the light outlet opening.

2. The light fixture of claim 1, wherein the at least one lighting source comprises a plurality of separately switchable individual lighting sources, at least two of the plurality of individual lighting sources being configured to emit light of different colors.

3. The light fixture of claim 1, further comprising a lighting controller configured to control the at least one lighting source.

4. The light fixture of claim 3, wherein the lighting controller includes a time controller.

5. The light fixture of claim 4, wherein the time controller is manually adjustable.

6. The light fixture of claim 4, wherein the time controller is automatically adjustable.

7. The light fixture of claim 3, wherein the lighting controller includes a brightness and/or direction controller configured to adjust the brightness and/or direction, respectively, of the beam of light.

8. The light fixture of claim 1, wherein the at least one filter comprises two or more spectral range filters.

9. The light fixture of claim 1, wherein the at least one filter is movable relative to the light outlet opening.

10. The light fixture of claim 9, wherein light fixture housing and at least one filter are substantially tubular and rotatable relative to one another.

11. The light fixture of claim 1, further comprising a filter controller configured to control the filter.

12. The light fixture of claim 1, further comprising a brightness sensor configured to detect the brightness of the beam of light.

13. The light fixture of claim 1, wherein the light generated by the two or more lighting source groups is in the visible range.

14. A method for controlling a spectral distribution of a light fixture comprising the following steps:
   emitting a beam of light through a light outlet opening in a light fixture housing, the beam of light generated by at least one light source in the light fixture housing, wherein the at least one light source comprises two or more lighting source groups or a plurality of separately switchable individual lighting sources, the two or more lighting source groups or plurality of separately switchable individual lighting sources being configured to emit light of different spectral distributions; and
   varying the spectral distribution of the beam of light by controlled switching on and off of the different lighting source groups or individual lighting sources or controlled adjustment of a filter.

15. The method of claim 14, wherein the varying of the spectral distribution of the beam of light is time-controlled.

16. The method of claim 14, further comprising varying the brightness and/or direction of the beam of light.

17. The method of claim 14, wherein the light generated by the at least one light source is in the visible range and in adjacent areas in the UV and IR ranges.

18. The method of claim 14, wherein varying the spectral distribution of the beam of light further comprises adjusting the color of the beam of light.

19. The method of claim 14, further comprising measuring an ambient brightness of the beam of light with a brightness sensor and adjusting the brightness of the beam of light in response to said measuring.

* * * * *